United States Patent [19]

Kleykamp

[11] 4,312,525
[45] Jan. 26, 1982

[54] HOSE CLAMP STRUCTURE AND METHOD OF MAKING SAME

[75] Inventor: Donald L. Kleykamp, Dayton, Ohio

[73] Assignee: Dayco Corporation, Dayton, Ohio

[21] Appl. No.: 153,981

[22] Filed: May 27, 1980

[51] Int. Cl.³ .............................................. F16L 33/22
[52] U.S. Cl. .................... 285/236; 285/242;
     285/DIG. 22; 29/450; 24/20 TT
[58] Field of Search ............... 285/236, 252, 253, 242,
     285/DIG. 22, 420; 24/20 TT, 21, 28, 371, 274
     WB; 29/450

[56] References Cited

U.S. PATENT DOCUMENTS

| | | | |
|---|---|---|---|
| 3,874,712 | 4/1975 | Watson | 285/236 |
| 4,010,518 | 3/1977 | Rejeski et al. | 24/371 X |
| 4,128,918 | 12/1978 | Wenk | 285/DIG. 22 X |

FOREIGN PATENT DOCUMENTS 2316017 10/1973 Fed. Rep. of Germany ...... 285/252

Primary Examiner—Thomas F. Callaghan
Attorney, Agent, or Firm—Joseph V. Tassone

[57] ABSTRACT

A hose clamp structure for a hose construction which has a hose end provided with a reinforcing wire and method of making such hose clamp structure are provided wherein the structure comprises a pair of separate cooperating interconnectible members each having an inner portion provided with a fastening opening and an outer portion provided with a plurality of teeth adapted for interconnecting engagement and wherein each interconnectible member is fastened on the hose end utilizing a single-piece clip which has a portion of the reinforcing wire bent within a portion thereof and the bent portion and its clip cooperate to fasten the associated member on the hose end.

20 Claims, 7 Drawing Figures

HOSE CLAMP STRUCTURE AND METHOD OF MAKING SAME

CROSS REFERENCE TO RELATED APPLICATION

This application is related to copending U.S. patent application Ser. No. 137,165 filed Apr. 4, 1980.

BACKGROUND OF THE INVENTION

1. Field of the Invention

This invention relates to a hose clamp structure for a wire-reinforced polymeric hose construction and method of making same.

2. Prior Art Statement

Hose clamps for flexible hose made primarily of polymeric material are well known and used throughout industry; and, one type of hose clamp which is widely used consists of an adjustable band which is disposed around an associated hose end and is used to clamp such hose end around an associated structure such as a conduit, pipe, or the like.

Another type of hose clamp is disclosed in U.S. Pat. No. 3,874,712 and uses a clamp which is crimped against an integral wire of a flexible conduit and the clamp uses an overcenter toggle link for tightening purposes.

It has also been proposed in the patent application cross-referenced above to provide a hose clamp structure comprised of a pair of separate cooperating interconnectible members each having a plurality of teeth adapted for interconnecting engagement with the members upon being fastened to an associated hose end and interconnected therearound extending substantially over a first arcuate length of the hose end with a second arcuate length of the hose end completing the remaining 360° C. circumference of the hose end and wherein the members when connected to the hose end employ the second arcuate length of the hose end as clamping means and the connected members and second arcuate length cooperate to define an annular construction enabling the hose end to be clamped around an associated structure. However, in such a hose clamp structure which utilizes a pair of cooperating interconnectible members it is important that such members be attached in position in a high-strength and economical manner yet without damage to the hose end.

SUMMARY

It is a feature of this invention to provide a hose clamp structure for a hose construction which has a hose end provided with a reinforcing wire wherein the hose clamp structure comprises a pair of separate interconnectible members and simple and economical means for fastening the interconnectible members in position in a high strength and economical manner while keeping the hose end free of damage.

Another feature of this invention is to provide a hose clamp structure of the character mentioned which utilizes a simple clip for fastening and holding each interconnectible member in position in a high strength manner against the hose end.

Another feature of this invention is to provide a hose clamp structure of the character mentioned in which the clip is a simple substantially U-shaped clip which has a substantially semicylindrical bight and a pair of parallel legs wherein one of the legs has a tool receiving opening therein and the other leg has holding means for receiving a radial convolution defined in the reinforcing wire.

Another feature of this invention is to provide a hose clamp structure of the character mentioned which utilizes a clip of the character mentioned made of a high strength metallic material.

Another feature of this invention is to provide a method of making a hose clamp structure of the character mentioned.

Therefore, it is an object of this invention to provide an improved hose clamp structure and method of making same having one or more of the novel features set forth above or hereinafter shown or described.

Other details, features, uses, objects, and advantages of this invention will become apparent from the embodiment thereof presented in the following specification, claims, and drawing.

BRIEF DESCRIPTION OF THE DRAWING

The accompanying drawing shows a present preferred embodiment of this invention, in which.

DETAILED DESCRIPTION

Figure 1:
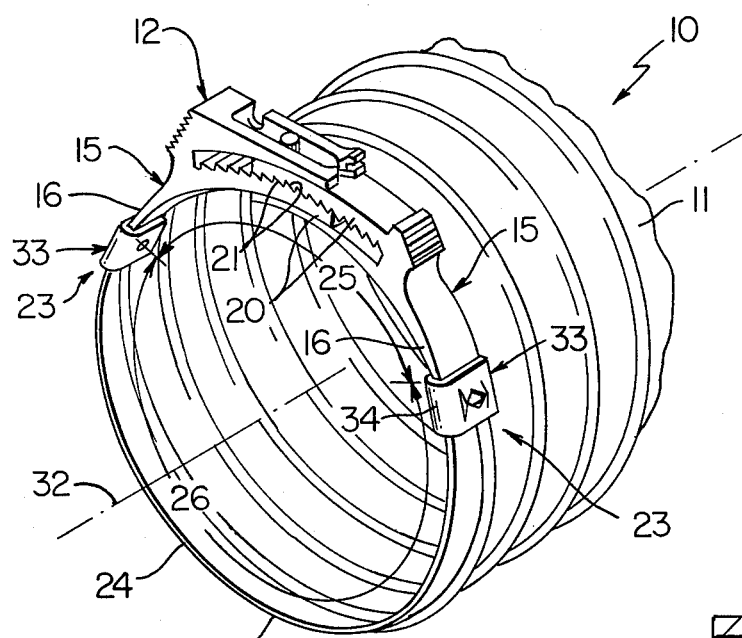
FIG. 1 is a fragmentary perspective view illustrating one end of an exemplary hose construction which has one exemplary embodiment of the hose clamp structure of this invention which is used to fasten the hose construction about an associated structure.

Reference is now made to FIG. 1 of the drawing which illustrates an exemplary hose construction which is designated generally by the reference numeral 10 and such hose construction comprises a flexible hose 11 and a hose clamp structure 12 of this invention at one end of the flexible hose 11. The hose clamp structure 12 is provided as an integral part of the hose construction 10 and is provided for the purpose of clamping or fastening its associated end of the hose construction 10 on an associated tubular structure such as a conduit, pipe, or the like. In this example a hose clamp structure 12 is illustrated at only one end of the hose construction; however, it is to be understood that such a hose clamp structure 12 may also be provided at the opposite end of the hose construction, if desired.

Figure 4:
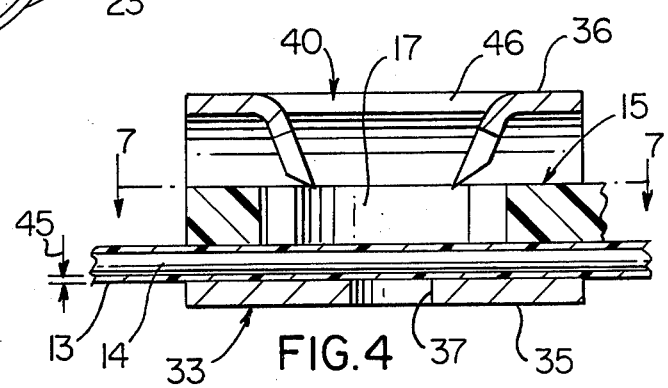
FIGS. 4, 5, and 6 illustrate a series of fragmentary cross-sectional views of typical sequential steps used in fastening an interconnectible member to the hose end using the clip of FIG. 2.

The hose 11 is made primarily of polymeric material which is designated by the reference numeral 13 in FIG. 4, for example; and, hose 11 has wire reinforcement therein in the form of a helically wound reinforcing wire 14. The wire 14 extends along the hose construction 10 providing reinforcement therefor; and, in particular assuring that the hose may be utilized in vacuum applications, or the like, in a non-collapsing manner. The hose 11 may be of any suitable type known in the art which comprises a reinforcing wire such as the helical reinforcing wire 14; and, in this example of the invention the hose 11 consists of an elongated ribbon or strip of polymeric material which is helically wound with associated edge portions in overlapped relation and with the wire 14 being helically wound with the required pitch so that it is interposed between the overlapped edges.

Figure 7:
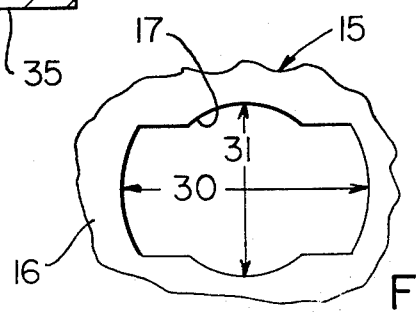
FIG. 7 is a view illustrating a typical elongate fastening opening in the inner portion of an interconnectible member which enables forming of a radial convolution in the reinforcing wire of the hose end without interference from the member.

The hose clamp structure 12 comprises a pair of separate cooperating interconnectible members each designated generally by the same reference numeral 15 and each of such members has an inner portion 16 provided with a fastening opening 17 which is illustrated in enlarged view in FIG. 7 of the drawing. Each member 15 has an outer portion 20 provided with a plurality of teeth 21 adapted for interconnecting engagement. Except for the fastening openings 17 in the inner portions 16 thereof the members 15 are substantially identical to the members described in the patent application cross referenced above and the disclosure of such application describing such members is incorporated herein by reference thereto.

The hose clamp structure 12 has means designated generally by the reference numeral 23 for connecting each of the members 15 to the reinforcing wire 14 in a hose end 24 of the hose 11. The members 15 upon being interconnected around the hose end, after fastening such members to the hose end, extend substantially over a first arcuate length 25 of the hose end with a second arcuate length 26 completing the remaining 360° C. circumference of the hose end. The members 15 upon being fastened to the hose end and interconnected to each other employ the second arcuate length 26 of the hose end 24 as clamping means; and, the connected members 15 and second arcuate length 26 cooperate to define an annular construction enabling the hose construction to be clamped around an associated conduit, or the like.

The fastening opening 17 in the inner portion 15 of each member 15 is an elongate opening having a major axis 30 and a minor axis 31 disposed perpendicular thereto and with the members 15 fastened into position on the end 24 of the hose 11 the major axes 30 of the members 15 are disposed substantially parallel to a longitudinal axis 32 of the hose construction 10.

The connecting means 23 for each of the members 15 comprises a substantially U-shaped clip which is designated generally by the reference numeral 33 (FIG. 2) and such clip has a substantially semicylindrical bight 34 and a pair of legs 35 and 36 extending from opposite ends of the bight 34. Each clip 33 has a tool-receiving opening 37 in one of its legs; and, in this example the tool-receiving opening 37 is a circular opening in the leg 35 thereof.

Figure 6:
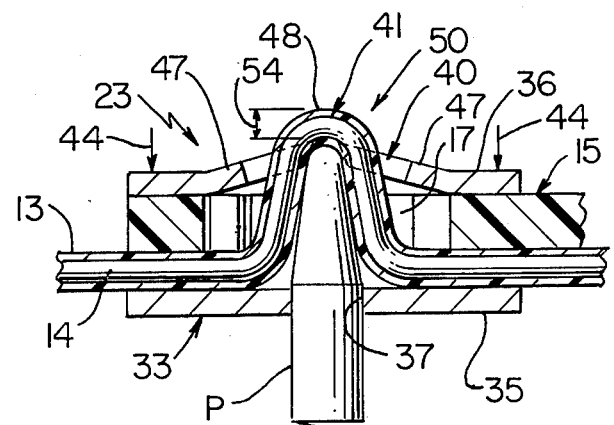

Each clip 33 also has holding means designated generally by the reference numeral 40 in the other of its parallel legs and in this example holding means 40 is provided in the leg 36 of the clip. The holding means 40 is particularly adapted to receive an associated radial convolution 41, as best seen in FIG. 6, which is defined in the reinforcing wire 14. The holding means 40 in each clip 33 is disposed substantially in aligned relation with its tool-receiving opening 37; and, as seen in FIG. 1 each clip 33 is disposed with its bight 34 against an end edge 42 of the hose end 24 and with its parallel legs 35 and 36 embracing the inner portion 16 of an associated member 15 and also embracing the hose end 24 with its reinforcing wire 14.

Figure 5:
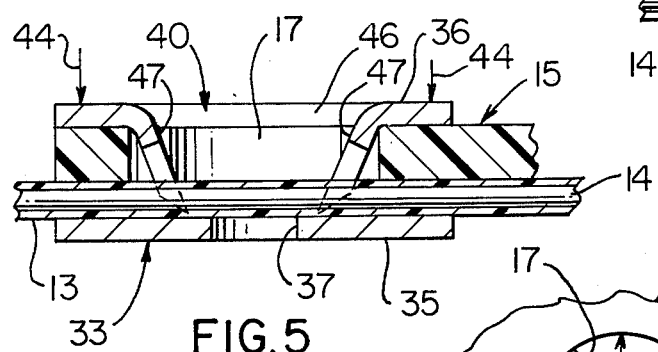

As best seen in FIGS. 4-6 each clip 33 has its tool-receiving opening 37 and holding means 40 disposed on opposite sides of and in aligned relation with an associated elongated fastening opening 17 and each radial convolution 41 is defined by an associated tool (such as a punch P, shown in FIG. 6) which has been urged radially through an associated tool-receiving opening 37, elongate fastening opening 17, and the holding means 40. This reference to the tool or punch P urging the wire 14 radially, as specified, to define the convolution 41 results in the tool-engaged portion of the wire 14 being bent or deformed and this is achieved while backing up leg 36 of the clip 33 utilizing a backup fixture or anvil which is indicated schematically by a pair of arrows 44 in FIGS. 5 and 6.

As mentioned earlier, the hose 11 may be defined by helically winding a strip of polymeric material so side edge portions thereof are disposed in overlapped relation and the reinforcing wire 14 is helically wound between the overlapped side edge portions. In this manner, the helically wound wire 14 has a thickness 45 of polymeric material 13 on opposite sides thereof as shown in FIG. 4. Thus, upon forming each radial convolution 41 it will be seen that such radial convolution also has the thickness 45 of polymeric material disposed radially outwardly thereof and hence defining its outermost convex surface 48 as shown in FIG. 6 and has such thickness defining its concave surface opposite the convex surface.

Figure 2:
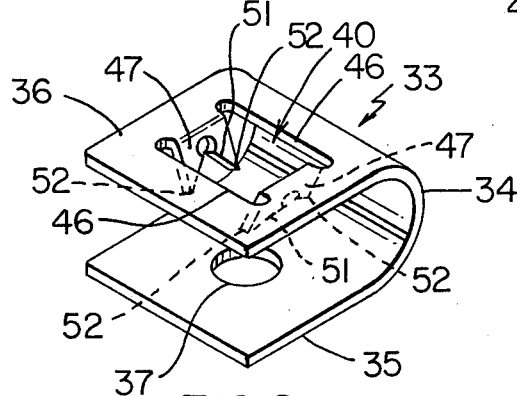
FIG. 2 is a perspective view illustrating a U-shaped clip which comprises the hose clamp structure of FIG. 1 and such clip is particularly adapted to fasten an associated interconnectible member to an end of the wire-reinforced polymeric hose comprising the hose construction.

The clip 33 has holding means 40 in the leg 36 thereof. The holding means 40 comprises an opening having a pair of spaced parallel edges each designated by the same reference numeral 46 and a pair of holding or fastening tabs each designated by the same reference numeral 47 defining an opposite pair of sides of the opening. Each of the tabs 47 is defined as an integral part of its leg 36 and initially extends toward the leg 35 thereof as shown in FIG. 2; however, upon forming an associated radial convolution 41 in an associated portion of the wire 14, the tabs 47 are bent outwardly and have the final configuration shown at 50 in FIG. 6.

Each of the tabs 47 has an edge 51 which engages and receives in wedged relation thereagainst a portion of the thickness 45 of the polymeric material 13 which is disposed radially outwardly of the radial convolution 41 and each edge is of roughly V-shaped edge 51. As each radial convolution 41 is formed by bending a portion of the wire 14 with its opposite sandwiching layers 45 outwardly the radial convolution 41 associated with a clip 33 is nested between two pairs of diverging legs 52 which define the V-shaped edge 51 in the two tabs 47 of such clip.

Figure 3:
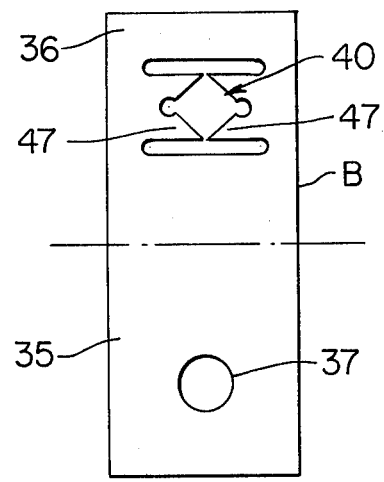
FIG. 3 is a plan view of a flat rectangular blank which has been partially formed and which is to be further formed to define the U-shaped clip of FIG. 2.

Each clip 33 is preferably made from a flat blank of hard sheet metal designated by the reference letter B in FIG. 3 and such blank has a rectangular outline. The tool-receiving opening 37 and holding means 40 with the tabs 47 thereof in coplanar relation are preferably defined therein with the blank B in a flat condition and this may be achieved utilizing suitable punch and die means (not shown) as is known in the art. The blank B is then further formed defining its U-shape and extending the tabs 47 transverse the leg 37 toward the leg 35.

Each member 15 is preferably made of a hard synthetic plastic material and using any technique known in the art, such as injection molding, for example. The opening 17 of each member 15 is preferably formed during molding.

The reinforcing wire 14 comprising the hose 11 is generally made of a high strength metal such as hard steel. Once a convolution 41 is defined therein and, in essence, locked within holding means 40 of an associated clip 33 there is minimum tendency for the convolution 41 to be damaged or otherwise changed in configuration even by applying substantial forces against the members 15. In addition, because each clip 33 is made of a high strength hard metallic material it retains, during normal use, an associated radial convolution 41 deformed therewithin also without damage to such clip 33 and its holding means 40.

The members 15 may be fastened to an associated hose end 24 with simplicity and while using only members 15 and clips 33. Accordingly, each member 15 is placed in position and an associated clip 33 is disposed with its bight 34 against the end edge 42 of the hose end 24 and with its parallel legs 35 and 36 embracing the inner portion 16 of an associated member 15 with its reinforcing wire 14. The tool-receiving opening 37 and holding means 40 of each clip 33 are aligned on opposite sides of an associated fastening opening 17 in the member 15 and with wire 14 also between opening 37 and holding means 40 whereupon a portion of the polymer lined reinforcing wire 14 is bent radially from the center of the hose end 24 using a punch P and a backup anvil or tool 44. With the anvil 44 in position the punch is urged through tool-receiving opening 37, elongate opening 17, and holding means to form an associated radial convolution 41.

During this urging by anvil backed punch P the tabs 47 are urged from positions illustrated in FIGS. 2, 4 and 5 to positions illustrated in FIG. 6. The substantially U-shaped clip 33 has legs 35 and 36 which initially are disposed in diverging relation; however, simultaneously with the forming of a convolution 41 in the wire 14 the legs 35-36 are moved and bight 34 permanently deformed so that at the completion of the forming action such legs are disposed in substantially parallel relation. Finally, during this urging and forming action it will be appreciated that the tabs 47 are moved from their positions in FIG. 2 to positions as illustrated in FIGS. 5 and 6. In the final position of FIG. 6 the pair of tabs is disposed radially inwardly of the outermost portion of its associated radial convolution 41 by a distance 54 as indicated in FIG. 6.

The forming of each convolution 41 by punch P and anvil 44 is achieved with at least a portion of the punch P within the hose 11 and the anvil 44 disposed outwardly of the hose circumference. The presentation of the anvil 44 and the punch P in FIG. 6 is basically schematic and is not intended to reflect this fact.

The hose 11 is a wire reinforced hose preferably made by helically winding a strip of suitable polymeric material as previously mentioned. Such a strip may be made of a suitable rubber or a suitable synthetic plastic material.

While present exemplary embodiments of this invention, and methods of practicing the same, have been illustrated and described, it will be recognized that this invention may be otherwise variously embodied and practiced within the scope of the following claims.

What is claimed is:

1. In a hose clamp structure for a hose construction which has a hose end provided with a reinforcing wire wherein said structure comprises a pair of separate cooperating interconnectible members each having an inner portion provided with a fastening opening and an outer portion provided with a plurality of teeth adapted for interconnecting engagement, and means for fastening each of said members to said reinforcing wire in said hose end, said members upon being interconnected around said hose end extending substantially over a first arcuate length of said hose end with a second arcuate length of said hose end completing the remaining 360° C. circumference of said hose end, said members upon being fastened to said hose end and interconnected to each other employing said second arcuate length of said hose end as clamping means, said connected members and second arcuate length cooperating to define an annular construction enabling said hose end to be clamped around an associated conduit, the improvement wherein each fastening opening is an elongate opening and said fastening means for each of said members comprises a U-shaped clip having a bight and a pair of legs, each clip having a tool-receiving opening in one of its legs and holding means in the other of its legs for receiving a radial convolution defined in said reinforcing wire, said holding means in each clip being disposed in aligned relation with its tool-receiving opening, each clip being disposed with its bight against an end edge of said hose end and with its parallel legs embracing the inner portion of an associated interconnectible member and hose end with its reinforcing wire, and each clip having its tool-receiving opening and holding means disposed on opposite sides of and in aligned relation with an associated elongate fastening opening, each radial convolution having been defined by a tool disposing same radially through an associated tool-receiving opening, elongate fastening opening, and holding means whereby each radial convolution and its clip cooperate to fasten an associated member on the hose end.

2. A hose clamp structure as set forth in claim 1 in which said tool-receiving opening in each clip is a circular opening and said bight is a substantially semicylindrical bight.

3. A hose clamp structure as set forth in claim 2 in which, said reinforcing wire and radial convolutions have a thickness of polymeric material disposed radially outwardly thereof, said holding means in the other of said legs of each clip comprises an opening having a pair of parallel edges defining one pair of opposed sides and having a pair of fastening tabs defining an opposite pair of opposed sides, each of said tabs is defined as an integral part of its parallel leg and initially extends toward the one leg of said clip which has said tool-receiving opening therein, and each of said tabs has an edge which engages and receives in wedged relation thereagainst a portion of said thickness of polymeric material disposed radially outwardly of said radial convolution.

4. A hose clamp structure as set forth in claim 3 in which said edge in each of said tabs is a roughly V-shaped edge.

5. A hose clamp structure as set forth in claim 4 in which each tab has a pair of legs which define its V-shaped edge and the radial convolution associated with each clip is nested between two pairs of diverging legs which define the two V-shaped edges in its tabs.

6. A hose clamp structure as set forth in claim 5 in which each clip is made of a metallic material.

7. A hose clamp structure as set forth in claim 6 in which each clip is made from a flat blank of said metallic material having a rectangular outline and having said tool-receiving opening and holding means at least partially defined therein while said blank is in a flat condition.

8. A hose clamp structure as set forth in claim 7 in which each of said interconnectible members is made of hard synthetic plastic material.

9. A hose clamp structure as set forth in claim 8 in which said metallic material is a hard metallic material which tends to retain each radial convolution therein during normal use of said hose clamp structure.

10. A hose clamp structure as set forth in claim 5 in which each pair of tabs is disposed radially inwardly of the outermost portion of its associated radial convolution.

11. A hose clamp structure as set forth in claim 1 in which said members and clips are the sole components defining said hose clamp structure.

12. In a method of making a hose clamp structure for a hose construction which has a hose end provided with a reinforcing wire comprising the steps of providing a pair of separate cooperating interconnectible members each having an inner portion provided with a fastening opening and an outer portion provided with a plurality of teeth adapted for interconnecting engagement, and fastening each of said members to said reinforcing wire in said hose end, said members upon being interconnected around said hose end extending substantially over a first arcuate length of said hose end with a second arcuate length of said hose end completing the remaining 360° circumference of said hose end, said members upon being fastened to said hose end and interconnected to each other employing said second arcuate length of said hose end as clamping means, said connected members and second arcuate length cooperating to define an annular construction enabling said hose end to be clamped around an associated conduit, the improvement comprising the steps of defining the fastening opening in each member as an elongate opening and wherein said fastening step comprises forming a U-shaped clip for use with each of said members with each clip having a bight and a pair of legs, said step of forming each clip comprises forming a tool-receiving opening in one of its legs and forming holding means in the other of its legs for receiving a radial convolution formed in said reinforcing wire, said holding means in each clip being disposed in aligned relation with its tool-receiving opening, disposing each clip with its bight against an end edge of said hose end and with its parallel legs embracing the inner portion of an associated member and hose end with its reinforcing wire, aligning the tool-receiving opening and holding means of each clip on opposite sides of and in aligned relation with an associated fastening opening and with said reinforcing wire, and bending a portion of said reinforcing wire which is adjacent each member radially to define a radial convolution therein, said bending being achieved by urging a tool radially through said tool-receiving opening, elongate opening, and holding means while engaging said wire portion whereby each radial convolution and its clip cooperate to fasten an associated member on the hose end.

13. A method as set forth in claim 12 in which the step of forming holding means in said other leg of each clip comprises defining an opening in a clip leg comprised of a pair of parallel edges which define one pair of opposed sides of said opening and defining a pair of fastening tabs which define an opposite pair of opposed sides of said opening, each of said tabs being defined as an integral part of its parallel leg and initially extends toward the one leg of said clip which has said tool-receiving opening therein, and each of said tabs has an edge which is adapted to receive and hold in wedged relation an associated radial convolution.

14. A method as set forth in claim 13 in which said step of forming holding means comprises forming a roughly V-shaped edge in each tab.

15. A method as set forth in claim 14 in which said bending step comprises nesting in said wedged relation an associated radial convolution between two V-shaped edges of associated tabs.

16. A method as set forth in claim 15 in which said bending step comprises bending each of said portions of said reinforcing wire with a punch.

17. A method as set forth in claim 16 in which said bending step is achieved while backing up said clip with an anvil.

18. A method as set forth in claim 17 in which said bending step comprises backing up said clip with said anvil disposed outwardly of the outside surface of said hose end and by urging said punch from within said hose radially outwardly.

19. A method as set forth in claim 12 in which said step of forming a U-shaped clip comprises forming said U-shaped clip from a flat rectangular blank.

20. A method as set forth in claim 12 in which said step of forming a U-shaped clip comprises forming said U-shaped clip from a flat rectangular blank of metallic material and defining the tool-receiving opening and holding means therein with tool and die means and with the blank in its flat condition.

* * * * *